(12) United States Patent
Hakim et al.

(10) Patent No.: US 9,513,762 B1
(45) Date of Patent: Dec. 6, 2016

(54) STATIC CONTENT UPDATES

(71) Applicant: Amazon Technologies, Inc., Reno, NV (US)

(72) Inventors: Mustafa Hakim, Mission Viejo, CA (US); Patrick Lee Baumann, Costa Mesa, CA (US); Abdullah Mohammed Jibaly, Foothill Ranch, CA (US); Jordan Petrov Marinov, Corona, CA (US); Kenley Bryan Capps, Rancho Santa Margarita, CA (US); Brigham Mark Brown, Lake Forest, CA (US)

(73) Assignee: Amazon Technologies, Inc., Seattle, WA (US)

( * ) Notice: Subject to any disclaimer, the term of this patent is extended or adjusted under 35 U.S.C. 154(b) by 809 days.

(21) Appl. No.: 13/706,547

(22) Filed: Dec. 6, 2012

(51) Int. Cl.
  *G06F 3/0481* (2013.01)
(52) U.S. Cl.
  CPC .................................. *G06F 3/0481* (2013.01)

(58) Field of Classification Search
  CPC .... G06F 8/38; G06F 17/30554; G06F 17/248; G06F 8/65
  USPC .................................................. 715/762, 760
  See application file for complete search history.

(56) References Cited

U.S. PATENT DOCUMENTS 8,073,970 B2 * 12/2011 Schwimer ..................... 709/241
8,631,394 B2 * 1/2014 Klots et al. ................... 717/152

* cited by examiner

*Primary Examiner* — Alvin Tan
*Assistant Examiner* — Sabrina Greene
(74) *Attorney, Agent, or Firm* — Thomas | Horstemeyer, LLP (57) ABSTRACT

Disclosed are various embodiments for an updatable package application. Updated static content elements of the packaged application are obtained from a content delivery service. The content update is verified as a function of the component static content elements and a manifest file. The application is reconfigured to execute as a function of the updated static content elements.

22 Claims, 5 Drawing Sheets

STATIC CONTENT UPDATES

BACKGROUND

Many applications render static content to generate user interfaces. Problems arise when application developers want to update the static content without forcing an update to the entire application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Client applications are often distributed as packaged applications. Packaged applications allow for user interfaces and other components to be defined using frameworks commonly associated with web applications, such as Hyper Text Markup Language 5 (HTML5), Javascript, Cascading Style Sheets (CSS), allowing for safe and familiar development processes. Packaged applications also allow for native executable functionality in order incorporate more powerful processes or device-native menu and style elements not available to web applications. This packaged application model results in a static component and a dynamic executable component. Packaged applications may conform to the Android Application Packages (APK) file format, or other formats.

When updating a packaged application, a developer typically has to generate a new package to be distributed to the client. Client applications incorporating a content update service can query a content delivery service for updates to the static content. If an update exists, it can be downloaded and stored in a client file system. The packaged application can then be reconfigured to render the downloaded static content. Manifests are used to ensure that the downloaded static content has not been altered, making security exploitations more difficult. Additionally, in the event that the manifest indicates that the integrity of the static content has been compromised, the packaged application can be reconfigured to render the packaged static content.

The static content may comprise updates to user interface elements or other components. The static content may also comprise precompiled versions of the static content. In many implementations, transformations to the static content are performed at run time. This may include optimizations for the device including display resolution or display orientation. This may also include translations generated from translation or dictionary files which are applied to placeholder elements. Runtime transformations are computationally expensive and inefficient when repeatedly performed.

By precompiling the static content and pushing it to the client via the content update service, the packaged application can obtain static content optimized for the client and in the required language. This saves the computational expenditure required to apply transformations at run time, and allows a developer to ship a single version of a packaged application and allow device-specific static content to be generated by the content compilation application.

In the following discussion, a general description of the system and its components is provided, followed by a discussion of the operation of the same.

Figure 1:
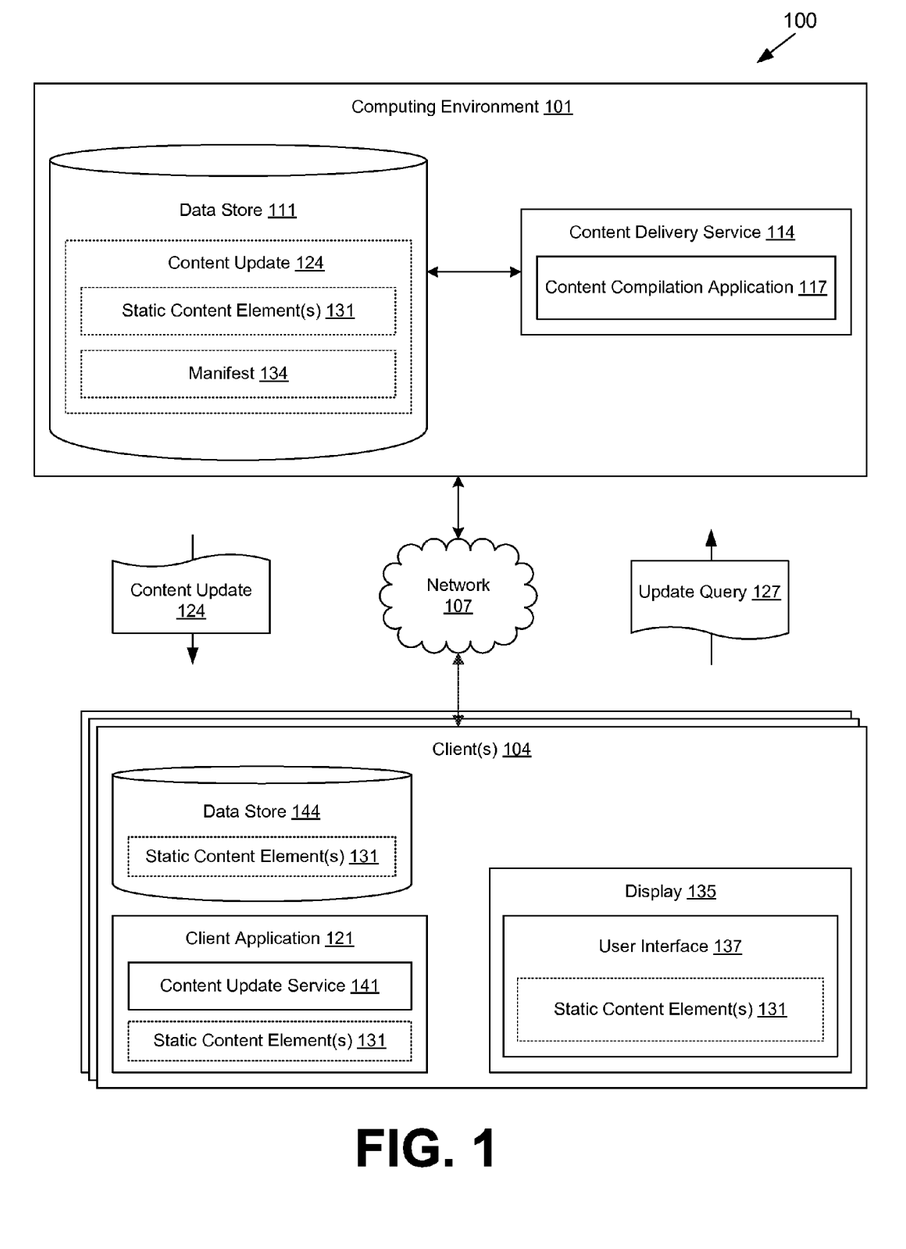
FIG. 1 is a drawing of a networked environment according to various embodiments of the present disclosure.

With reference to FIG. 1, shown is a networked environment 100 according to various embodiments. The networked environment 100 includes a computing environment 101, and a client 104 which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a content delivery service 114 having a content compilation application 117, and other applications, services, processes, systems, engines, or functionality not discussed in detail herein. The content delivery service 114 is executed to facilitate the obtaining of digital content by clients 104. The content delivery service 114 may comprise, for example, an application store for the purchase or rental of client applications 121 executable on a client 104. The content delivery service 114 may also comprise functionality to facilitate the updating of a client application 121. This may include maintaining and facilitating the communication of content updates 124 to the client 104, responding to update queries 127 communicated by the client 104, and other functionality.

Content updates 124 comprise at least one static content element 131, a manifest 134, and potentially other data. Static content elements 131 comprise static content to facilitate the execution of a client application 121. Examples of static content elements 131 include images, movies, Javascript files, CSS, files, HTML files, movie or animation files. Static content elements 131 may include other types of data, as well. Static content elements 131 may be discreet static content elements 131, or logically grouped such as into user interface templates or other collections.

Manifests 134 comprise a list of static content entries for each static content element 131 included in the content update 124. Each entry is also associate with an integrity identifier generated as a function of the corresponding one of the static content elements 131. The integrity identifier may comprise hash codes generated as a function of the at least corresponding one of the static content elements 131, and possibly other data. The integrity identifier may comprise other data, as well. The integrity codes are used to verify the integrity of static content elements 131 such that, if a static content element 131 is altered, the corresponding integrity code in the manifest 134 is also altered.

Manifests 134 may also be used to facilitate responses to update queries 127. A manifest 134 entry comprising different static content element 131 entries may indicate that a content update 124 should be communicated to the client. Manifests 134 may also facilitate other functionality. A manifest 134 may also comprise a data integrity element to ensure that the manifest 134 has not been altered. Such a data integrity element may include a digital signature signed with a private key, or other data.

The content compilation application 117 performs transformations on static content elements 131 before the content delivery service 114 pushes the static content elements 131 as components of a content update 124. Transformations may include altering the static content elements 131 for optimal rendering as a function of a display 135 resolution or orientation. Transformations may also include applying a translation to the static content elements 131. For example, static content elements 131 may comprise substitute translation strings and be associated with a dictionary or translation file. The content compilation application 117 may apply the dictionary or translation file to the substitute translation strings to generate compiled static content elements 131 for rendering by the client application 121.

The data stored in the data store 111 includes, for example, content updates 124 having static content elements 131 and manifests 134, and potentially other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 104 may include a display 135. The display 135 may comprise, for example, one or more devices such as liquid crystal display (LCD) displays, gas plasma-based flat panel displays, organic light emitting diode (OLED) displays, LCD projectors, or other types of display devices, etc.

The client 104 may be configured to execute various applications such as a client application 121 and/or other applications. The client application 121 may be executed in a client 104, for example, to access network content served up by the computing environment 101 and/or other servers, thereby rendering a user interface 137 on the display 135. The client application 121 may comprise a packaged application comprising one or more static content elements 131, and render the user interface 137 as a function of the static content elements 131.

Additionally, the client application 121 may implement a content update service 141 to facilitate the updating of static content elements 131 associated with the execution of the client application 121. The content update service 141 communicates an update query 127 to the content delivery service 114 to determine if a content update 124 is available for the client application 121. The content update service 141 then obtains a manifest 134 associated with the client application 121. Differences between static content elements 131 listed in the manifest 134 and the currently implemented static content element 131 indicates a need to obtain a content update 124.

If a content update 124 is required, then the content update service 124 obtains the content update 124 and reconfigures the client application 121 to access the downloaded static content elements 131 of the content update 124, as will be described in more detail below. The client 104 may be configured to execute applications beyond the client application 121 such as, for example, email applications, social networking applications, word processors, spreadsheets, and/or other applications.

Also, various data is stored in a data store 144 of the client 104. The data store 144 may be representative of a plurality of data stores 144 as can be appreciated. Data stored in the data store 144 may include static content elements 131, and potentially other data.

Next, a general description of the operation of the various components of the networked environment 100 is provided. To begin, a client 104 begins execution of a client application 121. The client application 121 may comprise a packaged client application 121 or another type of application. The client application 121 also comprises at least one static content element 131.

In some embodiments, the client application 121 may determine if the static content elements 131 accessed by the client application 121 are stored in a client application 121 packaged file system or a client 104 file system, such as a data store 144. In these embodiments, if the static content elements 131 are accessed from a client application 121 packaged file system, the client application 121 may copy the static content elements 131 from the packaged client application 121 to the client 104 file system. After copying the static content elements 131 to the client 104 file system, the client application 121 may then be reconfigured to access the static content elements 131 stored in the client 104 file system. Accessing the static content elements 131 may comprise, for example, rendering a user interface 137 as a function of the static content elements 131, or some other approach.

The content update service 141 of the client application 121 may communicate an update query 127 to the content delivery service 114 to determine if a content update 124 is available for the static content elements 131 of the client application 121. The update query 127 may be communicated responsive to the client application 121 beginning execution, a powering on or booting of a client 104, a passage of a predefined interval, or some other event or criteria.

Responsive to receiving the update query 127, the content delivery service 114 then communicates a manifest 134 to the client 104. The manifest 134 comprises unique identifiers corresponding to each of the static content elements 131 in the most recent content update 124. The manifest 134 may also comprise integrity codes such as hash codes generated as a function of each of the static content elements 131 in the corresponding content update 124. The manifest 134 may further comprise an electronic signature generated as a function of a private key accessible in the computing environment 101. The manifest 134 may also comprise other data.

After obtaining the manifest 134 the content update service 141 determines if the static content elements 131 being accessed by the client application 121 differ from the static content elements 131 of the most recent content update 124. This may comprise comparing identifiers associated with the static content elements 131. For example, if the static content elements 131 conform to a naming convention indicative of a version of the static content elements 131, the content update service 141 may compare the versions embodied in the file names of corresponding pairs of static content elements 131 in the client 104 and in the manifest 134. In other embodiments, the content update service 141 may determine if the manifest 134 is associated with static content elements 131 not present in the client 104, indicating a need to perform an update to obtain the additional static content elements 131. Determining if a content update 124 is required may also be performed by another approach.

In other embodiments, a content update 124 may be required when the static content elements 131 stored on the client 104 are not optimized for settings associated with the client 104. For example, the client 104 may have a language setting differing from a default language associated with the client application 121, and a content update 124 is required to obtain translated static content elements 131. In other embodiments, the static content elements 131 stored on the client may not be optimized for a display 135 orientation or resolution of the client 104. In such embodiments, the update query 127 may comprise data or metadata associated with the client 104 comprising parameters for applying transformations to static content elements 131 by a content compilation application 117 to generate the optimized static content elements 131.

In embodiments in which the manifest 134 comprises a signature, the content update service 141 may verify the integrity of the manifest 134 as a function of the signature, a public key, the manifest 134, or other data.

If the content update 124 is required, the content update service 141 then communicates an update query 127 comprising a request to download the content update 124. This may comprise obtaining the content update 124 and copying the static content elements 131 of the content update 124 to a client 104 file system, or some other approach. In embodiments in which the content update service 141 performs a verification of the manifest 134, the content update 124 may be downloaded responsive to the manifest 134 being verified.

In some embodiments, the static content elements 131 of the content update 124 may comprise precompiled static content elements 131 having some transformation applied to them by a content compilation application 117. In such embodiments, the content compilation application 117 may need to apply one or more transformations to static content elements 131 to generate the precompiled static content elements 131 optimized with respect to the client 104. These transformations may be applied as a function of data or metadata associated with the client 104 embodied in an update query 127 or another source.

In some embodiments, the content compilation application 117 applies a translation or dictionary file to static content elements 131 as a function of a language setting associated with a client 104. This may comprise, for example, replacing substitute strings or data in static content elements 131 with localized or language-specific strings corresponding to the substitute strings. In other embodiments, the content compilation application 117 may perform a transformation on the static content elements 131 as a function of a display 135 resolution or orientation. In further embodiments, translations may be performed as a function other data or attributes associated with the client 104.

After performing the transformations on the static content elements, the content compilation application 117 may store the precompiled static content elements 131 in a data store 111 for later retrieval, eliminating the need to repeatedly apply the same transformations to static content elements 131. In embodiments in which precompiled static content elements 131 are stored in a data store 111, the content delivery service 114 may load the precompiled static content elements 131 from the data store 111 responsive to an update query 127 as a substitute for or in conjunction with the content compilation application 117 applying transformations to the static content elements 131.

After downloading the content update 124, the content update service 141 may verify the integrity of the static content elements 131 of the content update 124. This may comprise generating hash codes as a function of each of the static content element 131 of the content update 124, and potentially other data. The generated hash codes are then compared to the corresponding hash codes contained in the manifest 134. The static content elements 131 are verified responsive to the generated hash codes matching the hash codes contained in the manifest 134. The static content elements 131 may also be verified by another approach.

Should the static content elements 131 of the content update 124 be invalid, the content update service 141 may delete the downloaded static content elements 131, delete the manifest 134, or take some other remedial action.

Next, responsive to a verification of the static content elements 131, the content update service 141 reconfigures the client application 121 to access the static content elements 131 of the content update 124. Reconfiguring the client application 121 may also be performed in response to a verification of the manifest 134, or another event.

Reconfiguring the client application 121 to access the static content elements of the content update 124 may comprise altering a reference in the client application 121 to static content elements 131 stored in a file system of the client 104. This may further comprise altering the reference such that it directs the client application 121 to access the location in the file system in which the downloaded static content elements 131 are stored. In some embodiments, after altering the reference, the content update service 141 deletes the static content elements 131 to which the reference was originally directed. Reconfiguring the client application 121 may also be performed by another approach.

In some embodiments, the content update service 141 may perform a verification of the static content elements 131 in the file system of the client 104 which are accessed by the client application 121 responsive to some event. The event may comprise a starting of the client application 121, passage of a predefined interval, input to the client application 121, or another event. Responsive to the static content elements 131 in the file system of the client 104 which are accessed by the client application 121 being invalid, the content update service 141 may take a remedial action.

In some embodiments, the remedial action may comprise reconfiguring the client application 121 to access a verified set of static content elements 131 stored on the client 104. In embodiments in which the client application 121 comprises a packaged client application 121, this may further comprise copying static content elements 131 stored in the file system of the packaged client application 121 to the file system of the client 104 and reconfiguring the client application 121 to access the copied static content elements 131. In further embodiments, this may comprise configuring the client application 121 to access the static content elements 131 stored in the file system of the packaged content application 121. Remedial actions may also be performed by the content update service 141 by another approach.

Figure 2:
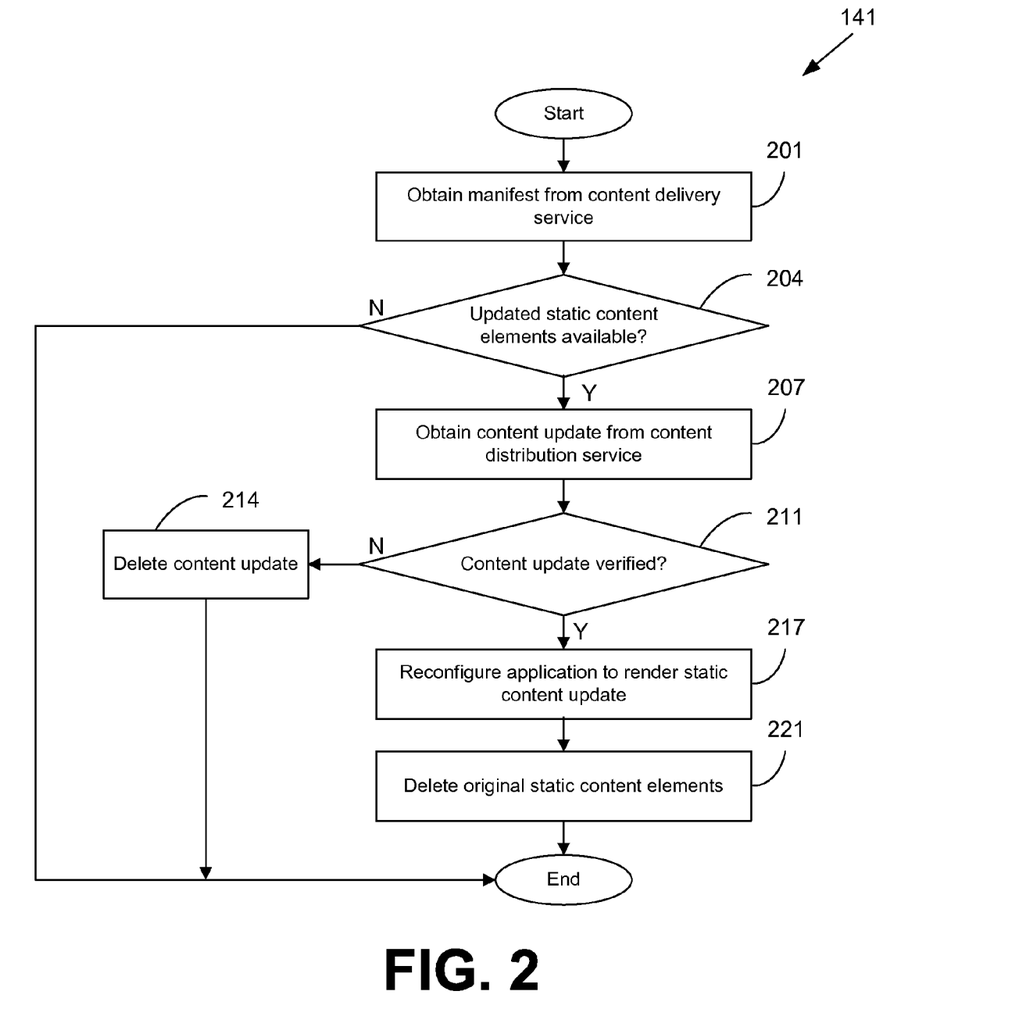
FIG. 2 is a flowchart illustrating one example of functionality implemented as portions of a content update service executed in a client in the networked environment of FIG. 1 according to various embodiments of the present disclosure.

Referring next to FIG. 2, shown is a flowchart that provides one example of the operation of a portion of the content update service 141 (FIG. 1) according to various embodiments. It is understood that the flowchart of FIG. 2 provides merely an example of the many different types of functional arrangements that may be employed to implement the operation of the portion of the content update service 141 as described herein. As an alternative, the flowchart of FIG. 2 may be viewed as depicting an example of steps of a method implemented in the client 104 (FIG. 1) according to one or more embodiments.

Beginning with box 201, the content update service 141 obtains a manifest 134 (FIG. 1) from a content delivery service 114 (FIG. 1) implemented in a computing environment 101 (FIG. 1). The manifest 134 may comprise unique identifiers corresponding to a collection of static content elements 131 (FIG. 1) of a content update 124 (FIG. 1) such as file names or other identifiers. The identifiers may embody a version or revision of the corresponding static content element 131 as defined by a file naming convention or other convention. The manifest 134 may further comprise hash codes each corresponding to one of the static content elements 131 and generated as a function of the corresponding one of the static content elements 131. The manifest 134 may also comprise other data.

Next, in box 204, the content update service 141 determines if updated static content elements 131 are available. This may comprise comparing file names or other identifiers of static content elements 131 to the file names or identifiers in the manifest 134. This may also comprise determining if the manifest 134 contains entries for static content elements 131 not stored on the client 104. Determining if updated static content elements 131 are available may also be performed by another approach.

If updated static content elements 131 are not available, the process ends. Otherwise, in box 207, the content update service 141 obtains a content update 124 associated with the obtained manifest 134. This may be performed by communicating an update query 127 (FIG. 1) to the content delivery service 114 thereby initiating a download of the content update 124, or by another approach.

Next, in box 211, the content update service 141 performs a verification of the content update 124. If the content update 124 is not verified, then the content update 124 is deleted in box 214. Otherwise, in box 217, the content update service 141 reconfigures the client application 121 to render the static content elements 131 of the content update 124. This may comprise modifying a reference in the client application 121 to be directed to a location in a file system of the client 104 where the static content elements 131 of the content update 124 are stored. The client application 121 may also be reconfigured by another approach.

In box 221, the content update service 141 then deletes the static content elements 131 originally rendered by the client application 121. This may comprise those static content elements 131 to which the reference of the client application 121 was originally directed, or other static content elements 131. Next, the process ends.

Figure 3:
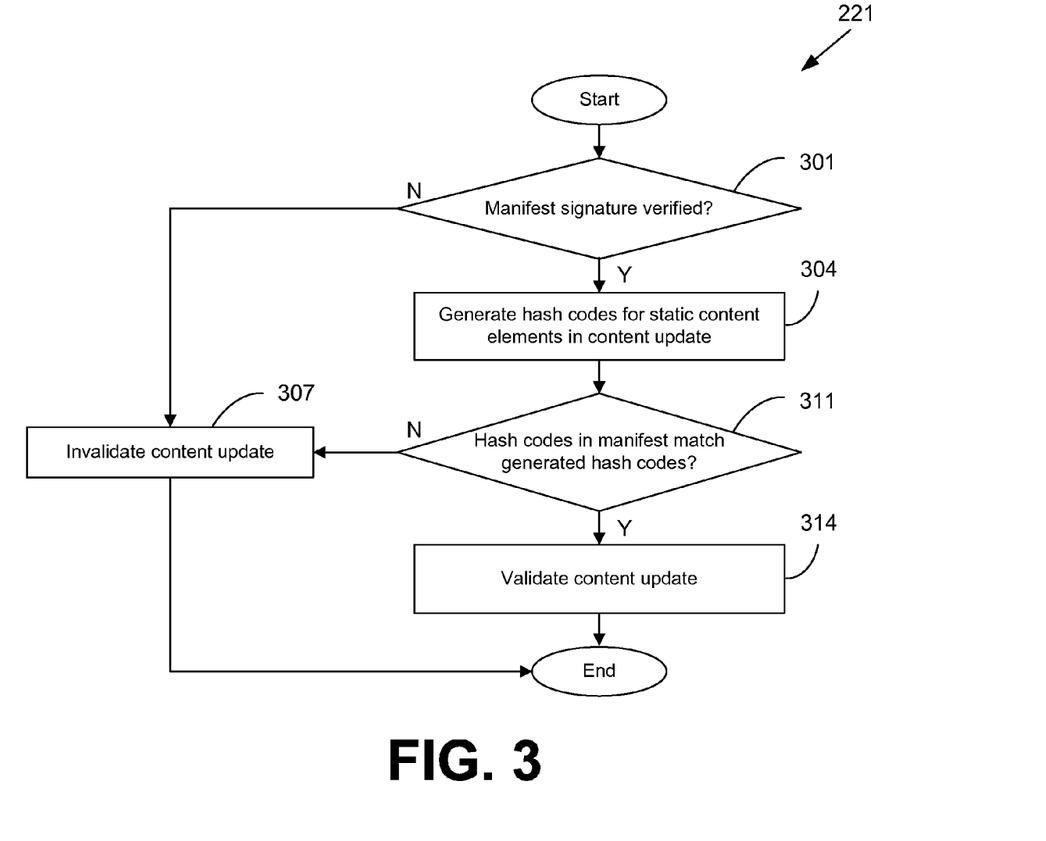
FIG. 3 is a flowchart illustrating one example of functionality implemented as portions of a content update service executed in a client in the networked environment of FIG. 1 according to various embodiments of the present disclosure.

Referring next to FIG. 3, shown is a flowchart that provides one example of the content update 124 (FIG. 1) verification operation of the content update service 141 (FIG. 1) according to various embodiments. It is understood that the flowchart of FIG. 3 provides merely an example of the many different types of functional arrangements that may be employed to implement the operation of the portion of the content update service 141 as described herein. As an alternative, the flowchart of FIG. 3 may be viewed as depicting an example of steps of a method implemented in the client 104 (FIG. 1) according to one or more embodiments.

FIG. 3 may describe a verification of a content update 124 as performed in box 211 (FIG. 2), responsive to a client application 121 (FIG. 1) beginning execution, or another event. Beginning with box 301, the content update service 141 (FIG. 1) verifies the manifest 134 (FIG. 1) of the content update 124. In embodiments in which the manifest 134 comprises a signature generated in a computing environment 101 (FIG. 1) as a function of a private key, verifying the manifest 134 may comprise a verification of the signature as a function of a public key accessible to the client 104. The manifest 134 may also be verified by another approach.

If the manifest 134 is not verified, then the content update 124 is invalidated in box 304 and the process ends. Otherwise, the content update service 141 generates hash codes for each of the static content elements 131 (FIG. 1) of the content update 124. The hash codes may be generated as a function of the corresponding one of the static content elements 131 of the content update 124 and potentially other data.

In box 311, if the generated hash codes fail to match each of the corresponding one of the hash codes of the manifest 134, the process proceeds to box 304 where the content update 124 is invalidated. If the generated hash codes each match the corresponding one of the hash codes of the manifest 134 the content update 124 is validated in box 314 and the process ends.

Figure 4:
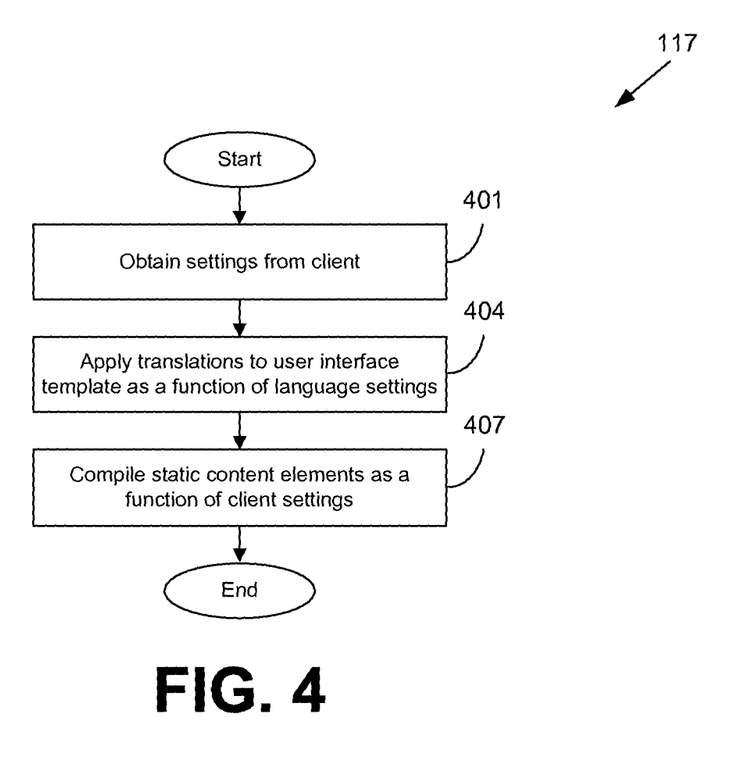
FIG. 4 is a flowchart illustrating one example of functionality implemented as portions of a content compilation application executed in a computing environment in the networked environment of FIG. 1 according to various embodiments of the present disclosure.

Referring next to FIG. 4, shown is a flowchart that provides one example of the static content element 131 (FIG. 1) compilation operation of the content compilation application 117 (FIG. 1) according to various embodiments. It is understood that the flowchart of FIG. 4 provides merely an example of the many different types of functional arrangements that may be employed to implement the operation of the portion of the content compilation application 117 as described herein. As an alternative, the flowchart of FIG. 4 may be viewed as depicting an example of steps of a method implemented in the computing environment 101 (FIG. 1) according to one or more embodiments.

Beginning with box 401, the content compilation application 117 obtains settings from a client 104 (FIG. 1) via a network 107 (FIG. 1). This may comprise obtaining an update query 127 (FIG. 1) communicated by the client 104 (FIG. 1), obtaining data embodied in an application program interface call executed by the client 104 (FIG. 1) or by another approach.

In box 404 the content compilation application 117 applies translations to static content elements 131 of a user interface template as a function of languate settings embodied in the obtained settings. This may comprise replacing substitute strings or data in the static content elements 131 with localized or language-specific text, images, or other data. This may be performed as a function of a dictionary or language file, or as a function of other data.

Next, in box 407, the content compilation application 117 compiles the static content elements 131 as a function of further client 104 settings. This may include performing transformations on the static content elements 131 as a function of a display 135 (FIG. 1) resolution, a display 135 orientation, or other features or characteristics of the client 104.

Figure 5:
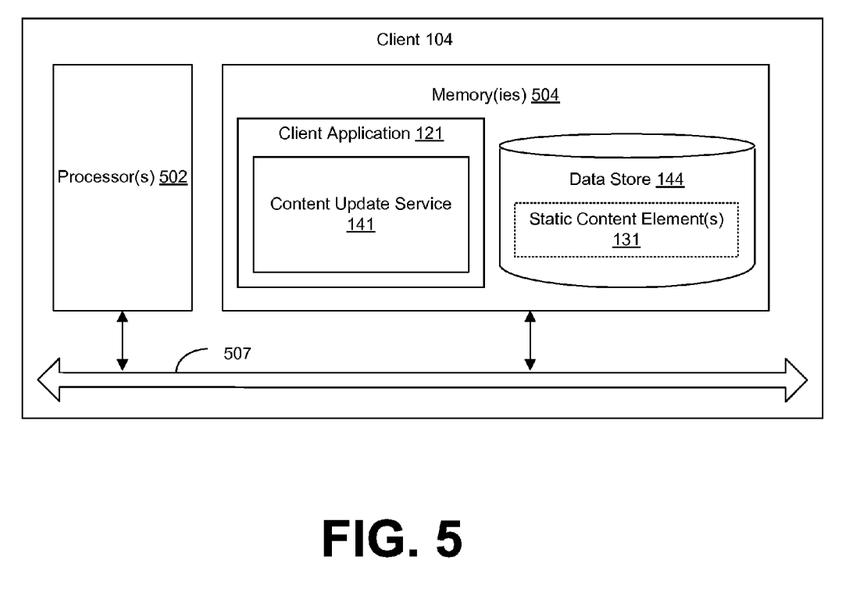
FIG. 5 is a schematic block diagram that provides one example illustration of a computing environment employed in the networked environment of FIG. 1 according to various embodiments of the present disclosure.

With reference to FIG. 5, shown is a schematic block diagram of the client 104 according to an embodiment of the present disclosure. Each client 104 includes at least one processor circuit, for example, having a processor 502 and a memory 504, both of which are coupled to a local interface 507. To this end, each client 104 may comprise, for example, at least one computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are list of main applications, and potentially other applications. Also stored in the memory 504 may be a data store ### and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although client update service 141 (FIG. 1), content compilation application 117 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2 and 3 show the functionality and operation of an implementation of portions of the content update service 141. The flowchart of FIG. 4 shows the functionality and operation of an implementation of portions of the content compilation application 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowcharts of FIGS. 2, 3, and 4 show a specific order of execution, it is understood that the order of execution may differ from that which is depicted. For example, the order of execution of two or more blocks may be scrambled relative to the order shown. Also, two or more blocks shown in succession in FIGS. 2, 3, and 4 may be executed concurrently or with partial concurrence. Further, in some embodiments, one or more of the blocks shown in FIGS. 2, 3, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a content compilation application 117 or a content update service 141, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
  a packaged executable application comprising:
    an original static content;
    code that copies the original static content from the packaged executable application to storage implemented in the at least one computing device;
    code that renders a user interface as a function of an original static content;
    code that obtains, from a content distribution service, a manifest comprising a first signature and a plurality of first hash codes, each of the first hash codes corresponding to one of a plurality of interface elements;
    code that obtains, from the content distribution service, an updated static content comprising the interface elements;
    code that generates a second signature as a function of a public key and the manifest;
    code that validates the manifest responsive to the first signature matching the second signature;
    code that generates a plurality of second hash codes as a function of the interface elements, each of the second hash codes corresponding to one of the interface elements;
    code that validates responsive to each of the first hash codes matching a corresponding one of the second hash codes; and
    code that, responsive to a validation of the updated static content and the manifest, performs a reconfiguration such that the user interface is rendered as a function of the updated static content.

2. The non-transitory computer-readable medium of claim 1, wherein the updated static content comprises a precompiled user interface template generated as a function of a translation applied to a base user interface template and a language setting associated with the computing device.

3. The non-transitory computer-readable medium of claim 1, wherein the updated static content comprises a precompiled user interface template generated as a function of at least one of a display resolution, a display orientation, or a device type associated with the computing device.

4. A system, comprising:
  at least one computing device; and
  an updatable package application executable in the at least one computing device, the updatable package application executable comprising:
    an original static content;
    logic that executes an operation as a function of the original static content;
    logic that obtains, from a content distribution service, a manifest;
    logic that obtains, from the content distribution service, an updated static content associated with the manifest;
    logic that validates the manifest;
    logic that validates the updated static content as a function of the manifest; and
    logic that, responsive to a validation of the updated static content and the manifest, performs a reconfiguration such that the operation is executed as a function of the updated static content.

5. The system of claim 4, wherein the updatable package application further comprises:
  logic that determines if the updated static content is available from the content distribution service as a function of the manifest; and
  wherein the updated static content is obtained responsive to the updated static content being available.

6. The system of claim 5, wherein determining if the updated static content is available is performed as a function of the manifest.

7. The system of claim 4, wherein the updatable package application further comprises logic that deletes the original static content from the computing device after the reconfiguration.

8. The system of claim 4, wherein the manifest comprises a signature generated as a function of a private key, and the logic that validates the manifest comprises logic that validates the signature as a function of a public key.

9. The system of claim 4, wherein the updated static content comprises a plurality of content elements and the manifest comprises a plurality of first hash values, each of the first hash values corresponding to one of the content elements, and the logic that validates the updated static content comprises:
   logic that generates a plurality of second hash values as a function of the content elements;
   logic that compares each of the first hash values and a corresponding one of the second hash values; and
   wherein the updated static content is validated responsive to each of the first hash values matching the corresponding one of the second hash values.

10. The system of claim 4, wherein the updatable package application further comprises:
   a packaged static content;
   logic that, responsive to the updatable package application beginning execution, verifies the original static content; and
   logic that, responsive to the original static content being invalid, replaces the original static content with the packaged static content.

11. The system of claim 4, wherein the at least one computing device is a first at least one computing device, the updated content comprises a user interface template, and the system further comprises:
   a second at least one computing device;
   wherein the content distribution service is executable on the second at least one computing device and further comprises logic that compiles the user interface template as a function of a device setting associated with the first at least one computing device.

12. The system of claim 11, wherein the device setting comprises a language setting, and the logic that compiles the user interface template further comprises logic that applies a translation to the user interface template as a function of the language setting.

13. The system of claim 11, wherein the device setting further comprises at least one of a display resolution, a display orientation, or a device type.

14. A method, comprising:
   obtaining, in a computing device, a manifest from a content distribution service;
   obtaining, in the computing device, a static content update associated with the manifest from the content distribution service;
   performing, in the computing device, a validation of the manifest;
   performing, in the computing device, a validation of the static content update as a function of the manifest;
   configuring, in the computing device, responsive to the manifest and the static content being valid, a package application to execute as a function of the static content update; and
   wherein the package application is configured to execute as a function of an original static content before obtaining the static content update.

15. The method of claim 14, wherein the manifest comprises a signature generated as a function of a private key, and performing a validation of the manifest comprises validating, in the computing device, the signature as a function of a public key and the manifest.

16. The method of claim 14, wherein the static content update comprises a plurality of interface elements, the manifest comprises a plurality of first hash codes, each of the first hash codes corresponding to one of the interface elements, and performing a validation of the static content update comprises:
   generating, in the computing device, a plurality of second hash codes each corresponding to one of the interface elements by applying a hashing algorithm to each of the interface elements;
   comparing, in the computing device, each of the first hash codes to a corresponding one of the second hash codes; and
   where a match of each of the first hash codes to the corresponding one of the second hash codes indicates the static content update is valid.

17. The method of claim 14, further comprising deleting, in the computing device, the original static content after the configuring.

18. The method of claim 14, further comprising:
   determining, in the computing device, after obtaining the manifest, whether the static content update differs from the original static content; and
   wherein obtaining the static content update is performed responsive to the static content update differing from the original static content.

19. The method of claim 14, wherein the package application comprises a packaged static content, and the method further comprises:
   performing, in the computing device, a validation of stored content used to generate a user interface;
   deleting, in the computing device, the stored content responsive to a failed validation;
   reconfiguring, in the computing device, the package application to execute as a function of the packaged static content; and
   wherein the stored content comprises the static content update or the original static content.

20. The method of claim 14, wherein the computing device is a first computing device, and the method further comprises:
   compiling, in a second computing device, an interface template;
   wherein the static content update comprises the interface template; and
   wherein the content distribution service is implemented in the second computing device.

21. The method of claim 20, wherein the interface template comprises a plurality of translation placeholder elements, and compiling the interface template comprises:
   obtaining, in the second computing device, a language setting associated with the package application; and
   replacing, in the second computing device, the translation placeholder elements with a plurality of native language elements as a function of the language setting.

22. The method of claim 20, wherein compiling the interface template is performed as a function of at least one of a display resolution, a display orientation, or a device type associated with the first computing device.

\* \* \* \* \*